United States Patent
Nitecki

[11] Patent Number: 5,965,825
[45] Date of Patent: Oct. 12, 1999

[54] PULSE ENCODER FOR A LIQUID DISPENSING DEVICE

[75] Inventor: Jean-Pierre Nitecki, Buc, France

[73] Assignee: Solutions Services Systems France S.A., Paris, France

[21] Appl. No.: 08/973,536

[22] PCT Filed: Jul. 2, 1996

[86] PCT No.: PCT/FR96/01030

§ 371 Date: Dec. 10, 1997

§ 102(e) Date: Dec. 10, 1997

[87] PCT Pub. No.: WO97/02473

PCT Pub. Date: Jan. 23, 1997

[30] Foreign Application Priority Data

Jul. 4, 1995 [FR] France .................................. 95 08164

[51] Int. Cl.$^6$ ............................. G01F 15/00; G01D 5/34; G01P 3/36; G01B 7/14
[52] U.S. Cl. ................... 73/861.77; 222/71; 250/231.18; 324/207.22; 324/174; 324/175
[58] Field of Search ............................. 73/861.77; 222/23, 222/71; 324/207.22, 207.25, 175, 165, 207.2, 207.21, 174; 250/230.13, 230.18

[56] References Cited

U.S. PATENT DOCUMENTS

| | | | |
|---|---|---|---|
| 3,230,767 | 1/1966 | Heigl et al. | 73/861.77 |
| 3,603,773 | 9/1971 | Carlstein | 341/157 |
| 3,660,644 | 5/1972 | Hammond et al. | 377/21 |
| 3,716,794 | 2/1973 | Teggatz et al. | 377/130 |
| 3,742,243 | 6/1973 | Gamble | 324/174 |
| 3,786,272 | 1/1974 | Gamble et al. | 324/174 |
| 3,831,011 | 8/1974 | Hulme et al. | 73/861.03 |
| 3,831,015 | 8/1974 | Hoff, Jr. | 364/718.03 |
| 3,873,814 | 3/1975 | Mirdadian | 73/861.77 |
| 4,005,603 | 2/1977 | Golahny et al. | 73/861.03 |
| 4,551,676 | 11/1985 | Amemiya et al. | 324/174 |
| 4,599,561 | 7/1986 | Takahashi et al. | 324/207.21 |
| 4,987,040 | 1/1991 | Iijima et al. | 324/207.21 |
| 5,396,063 | 3/1995 | Ito et al. | 250/231.18 |
| 5,418,362 | 5/1995 | Lusby et al. | 250/231.18 |
| 5,747,703 | 5/1998 | Plisson et al. | 73/861.77 |
| 5,816,246 | 10/1998 | Mirza | 73/861.77 |

*Primary Examiner*—Harshad Patel
*Attorney, Agent, or Firm*—Randall J. Knuth

[57] ABSTRACT

A pulse encoder for fitting to a meter of a liquid dispenser device for the purpose of supplying a signal representative of the flow of dispensed liquid. The encoder includes a coding wheel driven by the meter at a speed of rotation that is substantially proportional to the liquid flow rate. The wheel carries a first series of divisions of angular period P, and referred to as "primary" divisions. Two primary sensors which detect the primary divisions are angularly offset from each other by one-fourth of the angular period, i.e. P/4, modulo P, so as to provide two primary pulse signals that are likewise offset by one-fourth of a period. The coding wheel also carries a second series of divisions, referred to as "secondary" divisions, of angular period P' equal to twice the angular period P of the primary divisions. A secondary sensor is suitable for detecting the secondary divisions so as to supply a secondary pulse signal of a period that is double the period of the primary pulse signals. The encoder includes processor means suitable for supplying the signal representative of the flow of liquid dispensed on the basis of the primary and secondary pulse signals. The encoder is applicable to fuel dispensers.

4 Claims, 6 Drawing Sheets

PULSE ENCODER FOR A LIQUID DISPENSING DEVICE

FIELD OF THE INVENTION

The present invention relates to a pulse encoder for fitting to the meter of a liquid dispenser device in order to deliver a signal representative of the flow of dispensed liquid.

A particularly advantageous application of the invention lies in the field of dispensing fuel.

Below in this text, the general term "meter" is used without distinction both for volume meters and for flow rate meters, it being understood that in the first case the signal representative of the dispensed liquid flow is a volume signal that enables the volume of liquid dispensed to be calculated by summing the pulses, whereas in the second case, said signal representative of the dispensed liquid flow is a flow rate signal enabling the volume of liquid dispensed to be calculated by integrating a pulse frequency.

BACKGROUND OF THE INVENTION

By way of example, fuel-pump meters in a fuel dispensing station usually comprise a pump enabling said fuel to be brought from a storage tank to a delivery point, in this case the tank of a vehicle, by passing through a volume meter or measurer whose function, in quite general terms, is to produce rotary motion from the flow of fuel in such a manner that one complete revolution corresponds to a known given volume of fuel passing through the meter.

An encoding system coupled to said rotary motion in association with the volume meter forms measurement apparatus suitable for forming a signal representative of the volume flow of fuel that had been dispensed, which signal is processed by a computer designed to sum the volume signal received from the encoding system so as to be able to determine the volume of fuel dispensed by the fuel-pump meter in question, and also the amount that needs to be paid, given the price per liter of fuel.

This information is then displayed to the customer on a display incorporated in the corresponding fuel pump meter.

The encoding systems most commonly used are pulse encoders suitable for delivering an electrical signal constituted by a series of pulses, each of which corresponds to the volume increment at which the volume of fuel dispensed is measured, e.g. 1 cl.

In principle, a pulse encoder comprises a coding wheel mechanically coupled to the meter and thus driven by the meter at a speed of rotation that is substantially proportional to the flow rate of the liquid. Said coding wheel carries a series of divisions, e.g. on its periphery, which in one particular embodiment may be constituted merely by slots of angular period P corresponding to said measurement volume increment.

While the coding wheel is rotating, a single sensor, e.g. an optical sensor, disposed to be able to detect the passage of said slots then provides a pulse signal that is representative of the volume flow of liquid dispensed.

This signal is sent to the computer which then establishes the volume of liquid dispensed by multiplying the total number of pulses received by the volume measurement increment.

Nevertheless, that type of known pulse encoder suffers from several drawbacks.

Firstly, it does not enable the direction of rotation of the flow meter to be defined. It is therefore not possible to detect when the direction of rotation is reversed, e.g. due to hydraulic hammer, and as a result, the encoder continues to deliver pulses even when the rotation of the coding wheel is in reverse and no volume of liquid is flowing. Since these interference pulses are taken into account by the computer along with the others, this results in an overestimate of the volume of liquid dispensed.

Also, during small-amplitude oscillations of the meter, it can happen that the level of the signal provided by the sensor remains constant, i.e. at a high level if the sensor remains in register with a slot, or at a low level if the sensor remains in register with a land between two consecutive slots. However, a low level can also be due to a fault in the sensor itself, so it is not possible with that type of encoder to distinguish between the phenomenon of small oscillations and the sensor being out of operation. Unfortunately, it is essential to be able, at all times, to detect a breakdown of the sensor.

To remedy those drawbacks, proposals have been made to add a second sensor to an existing sensor, with the second sensor likewise being suitable for detecting the same divisions of the coding wheel as the first sensor, but being offset therefrom by one-fourth of an angular period, i.e. P/4, modulo P. It can be shown that under such circumstances, by comparing the two pulse signals delivered by the two sensors, it is possible to determine the direction of rotation of the wheel and thus to eliminate the influence of large-amplitude oscillations. Nevertheless, even with the presence of two such sensors, it is still not possible to be certain of detecting the breakdown of one of the sensors, since under such circumstances the signals supplied can be confused with those that can be obtained in certain cases of small oscillations.

In order to remove all ambiguity in the interpretation of the signals, it is possible to pierce a hole through the coding wheel and to associate that hole with a third sensor. In such a configuration, any one of the sensors being out of operation can be diagnosed reliably. However, this diagnosis takes place only after the coding wheel has revolved through one complete turn, i.e. after a delay that is considered as being excessive.

SUMMARY OF THE INVENTION

Thus, the technical problem to be solved by the subject matter of the present invention is to provide a pulse encoder for fitting to a meter in a liquid dispensing device with the purpose of providing a signal that is representative of the flow of liquid dispensed, said encoder comprising:

a coding wheel driven by said meter at a speed of rotation that is substantially proportional to the liquid flow rate, said wheel carrying a first series of divisions of angular period P, and referred to as "primary" divisions;

two primary sensors suitable for detecting said primary divisions and angularly offset from each other by one-fourth of the angular period, i.e. P/4, modulo P, so as to provide two primary pulse signals that are likewise offset by one-fourth of a period;

which encoder makes it possible to detect much more quickly when one of its sensors is not in operation.

According to the present invention, the solution to the technical problem posed consists in that:

said coding wheel also carries a second series of divisions, referred to as "secondary" divisions, of angular period P' equal to twice the angular period P of the primary divisions, a secondary sensor being suitable for detecting said secondary divisions so as to supply a secondary pulse signal of period that is double the period of the primary pulse signals; and said encoder includes processor means suitable for supplying said signal representative of the flow of liquid dispensed on the basis of the primary and secondary pulse signals.

Thus, as explained in detail below, the pulse encoder of the invention makes it possible to detect a breakdown of one of its sensors after the coding wheel has rotated through 2P, i.e. the angular period of the series of secondary divisions, thus making it possible to detect breakdown more quickly, e.g. by a factor of 25, compared with the above-described encoder having an auxiliary hole.

In a first embodiment, said divisions are slots formed along two concentric rings of the coding wheel, said sensors being optical sensors.

In a second embodiment, said divisions are pairs of opposite magnetic poles disposed in alternation around two concentric rings of the coding wheel, said sensors being Hall-effect sensors.

What the invention consists in and how it can be embodied will be well understood from the following description with reference to the accompanying drawings, given as non-limiting examples.

BRIEF DESCRIPTION OF THE DRAWINGS

FIG. 1b is a section on line C—C of FIG. 1a.

FIG. 4a is a timing diagram of the pulse signals delivered by the sensors of the FIG. 2b encoder.

FIG. 4b is a timing diagram showing the primary pulse signals of FIG. 4a after pulse shaping.

FIG. 5 is a block diagram of means for processing the pulse signals of FIG. 3a.

DETAILED DESCRIPTION OF THE PREFERRED EMBODIMENTS

Figure 1A:
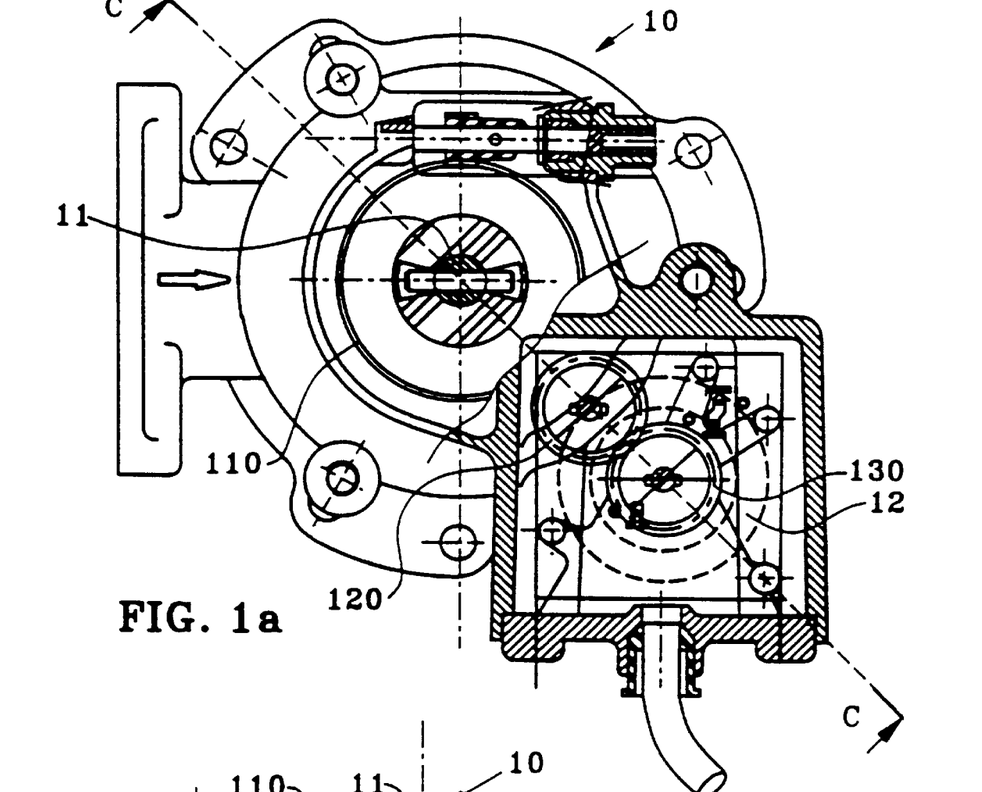
FIG. 1a is a plan view of a flow rate meter fitted with a pulse encoder of the invention.
Figure 1B:
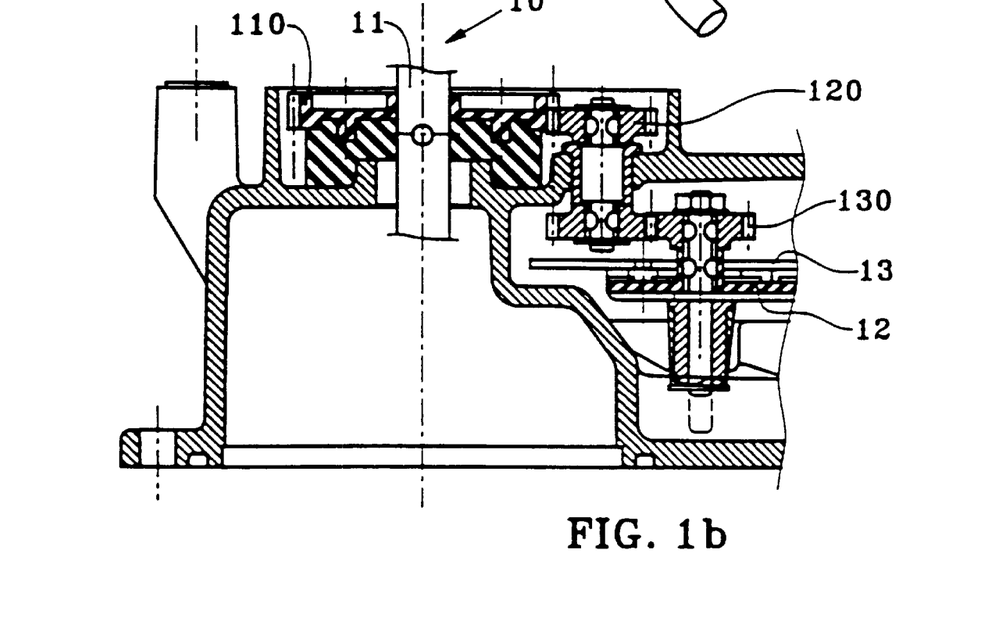

FIG. 1a and 1b are a plan view and section view of a meter 10, e.g. a volume meter, belonging to a device for dispensing a liquid, such as a fuel, and having the function of supplying a signal representative of the volume flow of liquid dispensed. A computer, not shown but of known type, receives this signal and processes it in appropriate manner to determine the total volume of liquid dispensed, in compliance with the accuracy and the safety that are laid down by the standards in force.

The volume meter 10 of FIG. 1a and 1b is constituted by a member such as a very conventional four-piston apparatus suitable for causing a shaft 11 to rotate at an angular velocity that is substantially proportional to the liquid flow rate through the dispenser device.

By way of example, the meter 10 is made in such a manner that one complete turn of the shaft 11 through 360° corresponds to dispensing a volume of 0.5 liters (l) of liquid.

The shaft 11 of the volume meter 10 is coupled to a first gear wheel 110 of a gear box which drives a second gear wheel 120 at a ratio of 2.5:1. A third gear wheel 130 at a ratio of 1:1 to the second gear wheel 120 is provided with a coding wheel 12 whose angular velocity is such that one complete 360° turn corresponds to a volume of 0.2 of liquid.

In order to obtain a measurement volume increment for the volume of liquid dispensed that is equal to 1 cl, for example, the coding wheel 12 carries a series of 20 divisions $d_i$ (i=1, . . . , 20), which divisions are said to be "primary" divisions, being at a period P that is equal to $360°/20=18°$.

Figure 2A:
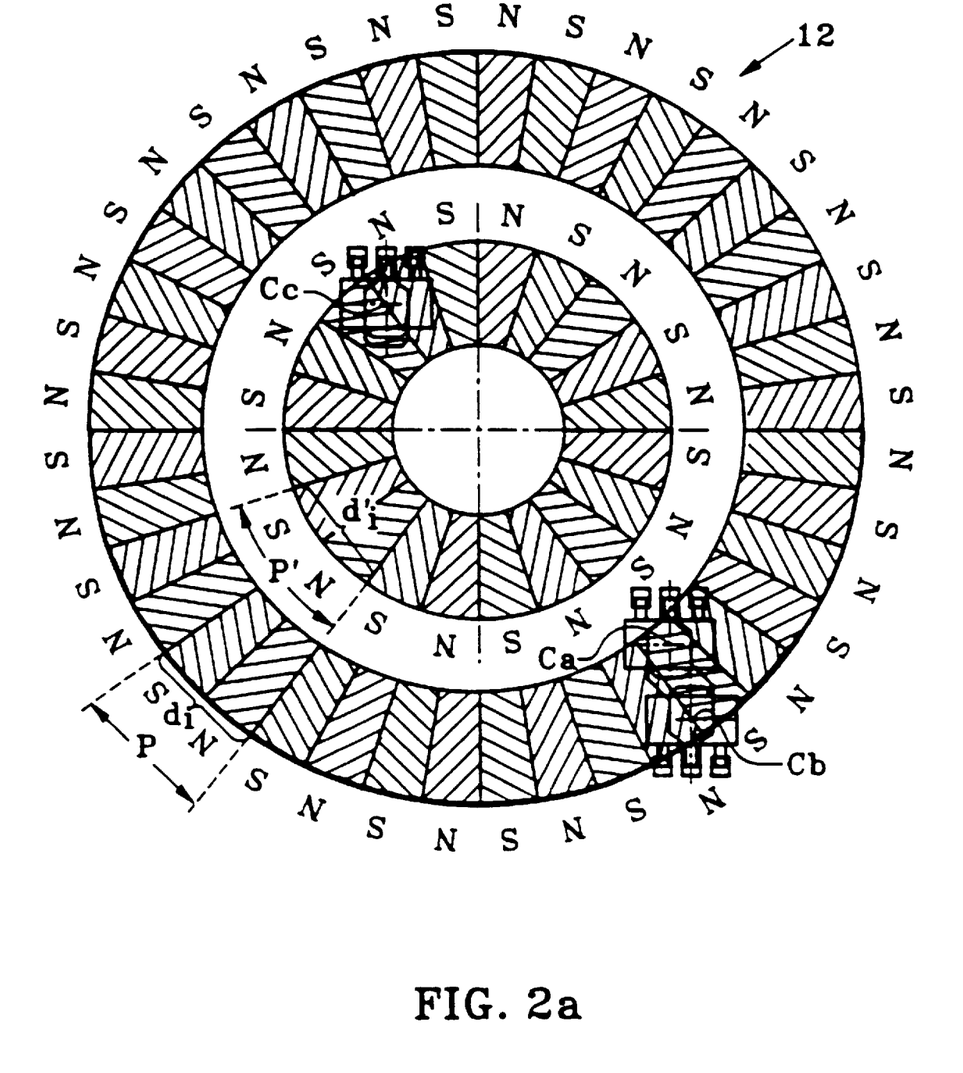
FIG. 2a is a plan view of an encoding wheel having magnetic poles, and of the associated Hall-effect sensors.

In the embodiment of FIG. 2a, said primary divisions $d_i$ are formed by 20 pairs of opposite N and S magnetic poles disposed in alternation around an outer ring of the wheel 12. The angular width of an N or an S magnetic pole is therefore 9° of arc.

The coding wheel 12 may be made of molded polyamide PA6/6 filled with magnetic powder, e.g. Flexam P, with the magnetic poles being magnetized during molding using a manufacturing technique that is known, in particular for its applications in the motor industry.

Two sensors Ca and Cb of the Hall-effect type, referred to as "primary sensors" are placed in register with the outer ring of primary divisions $d_i$ on a fixed support 13 that can be seen in FIG. 1b. As shown in FIG. 2a, the sensors Ca and Cb are offset by one-fourth of the angular period, i.e. $P/4=4.5°$ in the present example. Thus, during rotation of the coding wheel 12, the sensors Ca and Cb are capable of detecting transitions from one magnetic polarity to the other and of delivering respective pulsed signals Sa and Sb which are offset by one-fourth of the period, as can be seen in FIG. 3a.

Naturally, starting from their immediately consecutive position of FIG. 2a, the primary sensors Ca and Cb could be shifted relative to each other by an integer number of angular periods P.

Figure 3A:
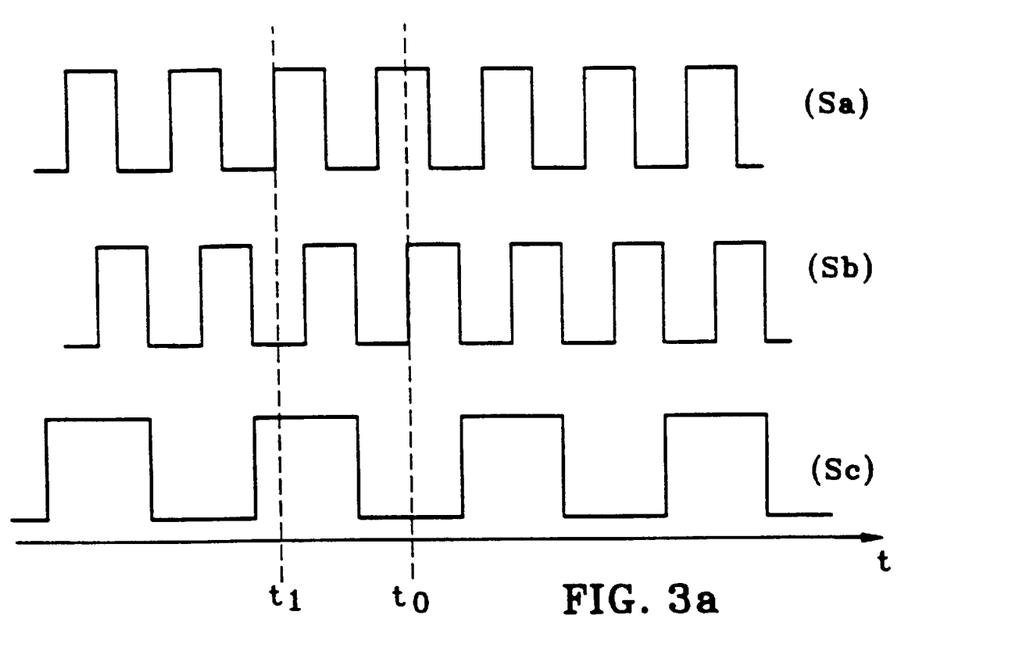
FIGS. 3a, 3b, and 3c are timing diagrams of the pulse signals delivered by the sensors of the FIG. 2a encoder.

FIG. 3a shows the signals Sa and Sb respectively delivered by the sensors Ca and Cb in normal operation of the pulse encoder of the invention.

Figure 3B:
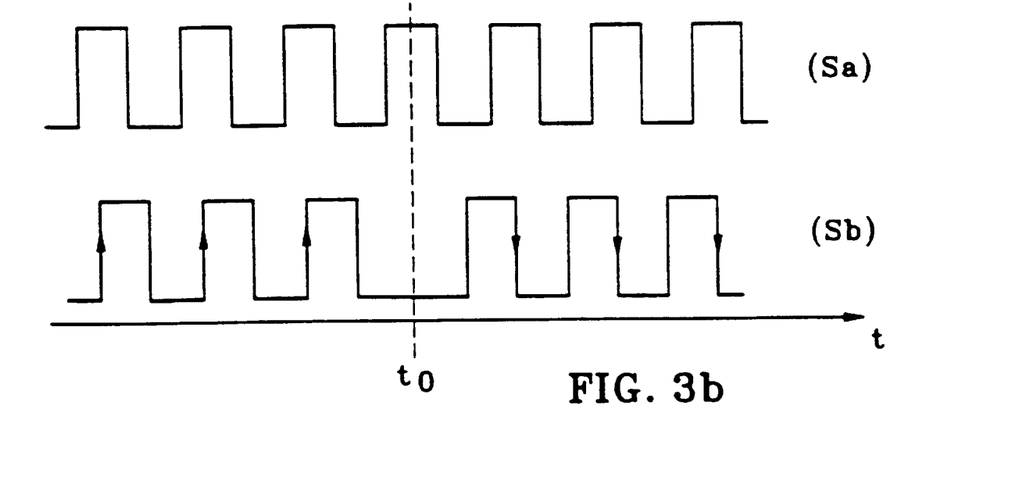

FIG. 3b shows how these signals become modified when the direction of rotation of the coding wheel 12 is reversed during a large-amplitude oscillation of the axis 11 of the flow meter 10. It can be seen clearly in FIG. 3b that reversal of the direction of movement at instant to gives rise to a phase reversal of the signals Sa and Sb, or to a phase shift of one period. It can be seen in particular that the rising edge in the signal Sb appears while the signal Sa is high, for example, before direction reversal, whereas after reversal, it appears when the signal Sb is low. Thus, merely by comparing the signals Sa and Sb only, it is possible to detect a reversal in the direction of rotation of the flow meter and to take account thereof when generating the final signal delivered to the computer for measuring the volume of liquid dispensed, as explained in greater detail below.

Figure 3C:
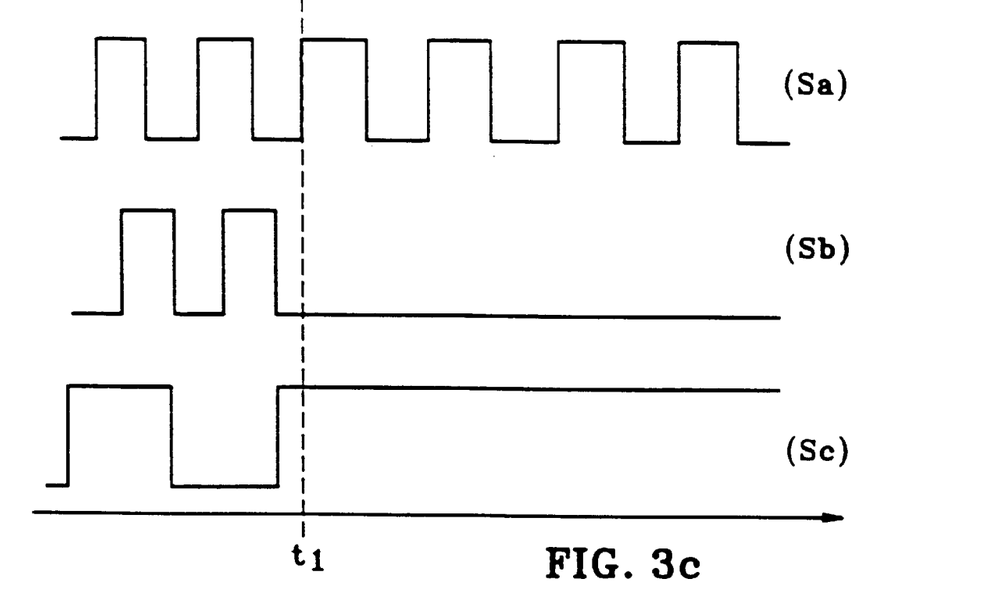

FIG. 3c shows the primary signals Sa and Sb supplied by the sensors Ca and Cb during small-amplitude oscillations which began at an instant $t_1$. It can be seen that the signal Sa retains the general appearance of a signal representative of normal rotation of the coding wheel 12, while the signal Sb remains at a constant level, low in the example given, because the amplitude of the oscillations is too small to make N-S transitions occur.

Figure 3D:
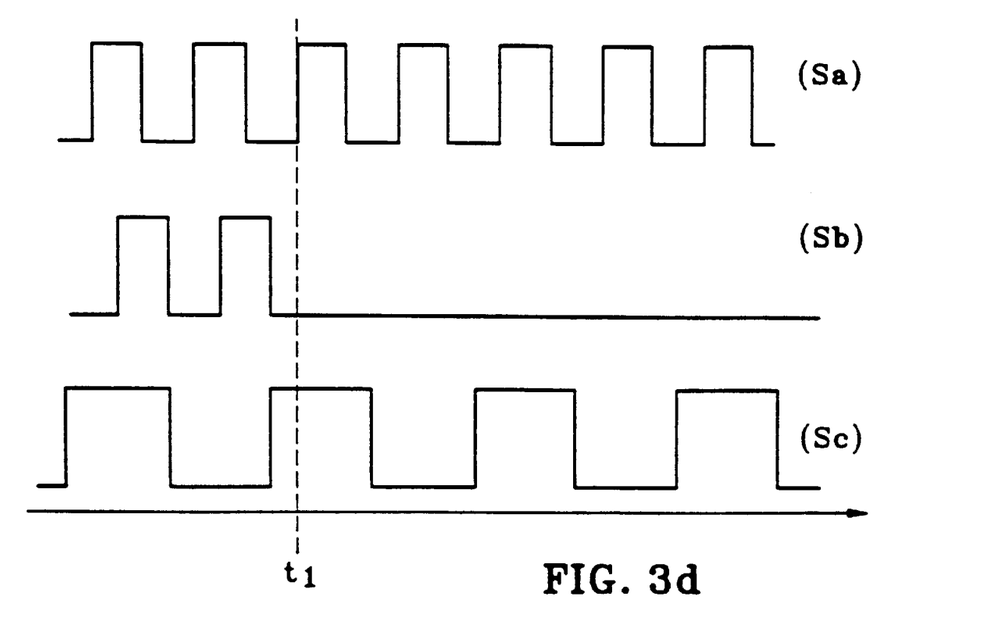

Similarly, FIG. 3d shows the same signals Sa and Sb when the primary sensor Sb goes out of operation at an instant $t_1$. Naturally, the signal Sa remains unchanged compared with that of FIG. 3a, while the signal Sb remains at a constant level, which is low in the example given.

It can thus clearly be seen from these examples that it can be very difficult to distinguish between low amplitude oscillations and a breakdown of one of the sensors.

To remedy this difficulty, the coding wheel 12 of the pulse encoder of the invention is provided, as shown in FIG. 2a, with a second series of divisions d'$_i$, referred to as "secondary" divisions, at an angular period P' that is double P, equal to double the angular period of the primary divisions d$_i$, i.e. 2P or 36°. These secondary divisions d'$_i$ are formed, like the primary divisions d$_i$, by pairs of opposite N, S magnetic poles disposed in alternation around a concentric inner ring of the coding wheel 12. Thus, in the embodiment shown, there are 10 pairs of poles, with the angular width of a secondary division d'$_i$ being 36° and that of one of its poles being 18°.

A secondary sensor Cc, likewise a Hall-effect sensor, is placed in register with the inner ring of secondary divisions and delivers a secondary pulse signal Sc as shown in FIG. 3a having a period that is twice the period of the primary pulse signals Sa and Sb.

It will be understood from FIGS. 3c and 3d that observing the behavior of the secondary signal Sc makes it possible to determine whether a constant level, low in the example, of a primary sensor, specifically the sensor Cb, is due to small oscillations of the coding wheel 12 or to a breakdown of said primary sensor. Low amplitude oscillations will give rise to a constant level, e.g. 1 high, in the secondary signal Sc, whereas a breakdown of a primary detector will have no effect on the behavior of the secondary sensor which will continue to operate normally.

The state of a primary sensor can thus be diagnosed quite safely at the end of one period P' of the secondary divisions, i.e. 36° in the present case.

It will be observed that the encoding system built in this way also makes it possible to detect the sensor Cc going out of operation, or indeed any two of the three sensors going out of operation.

Figure 2B:
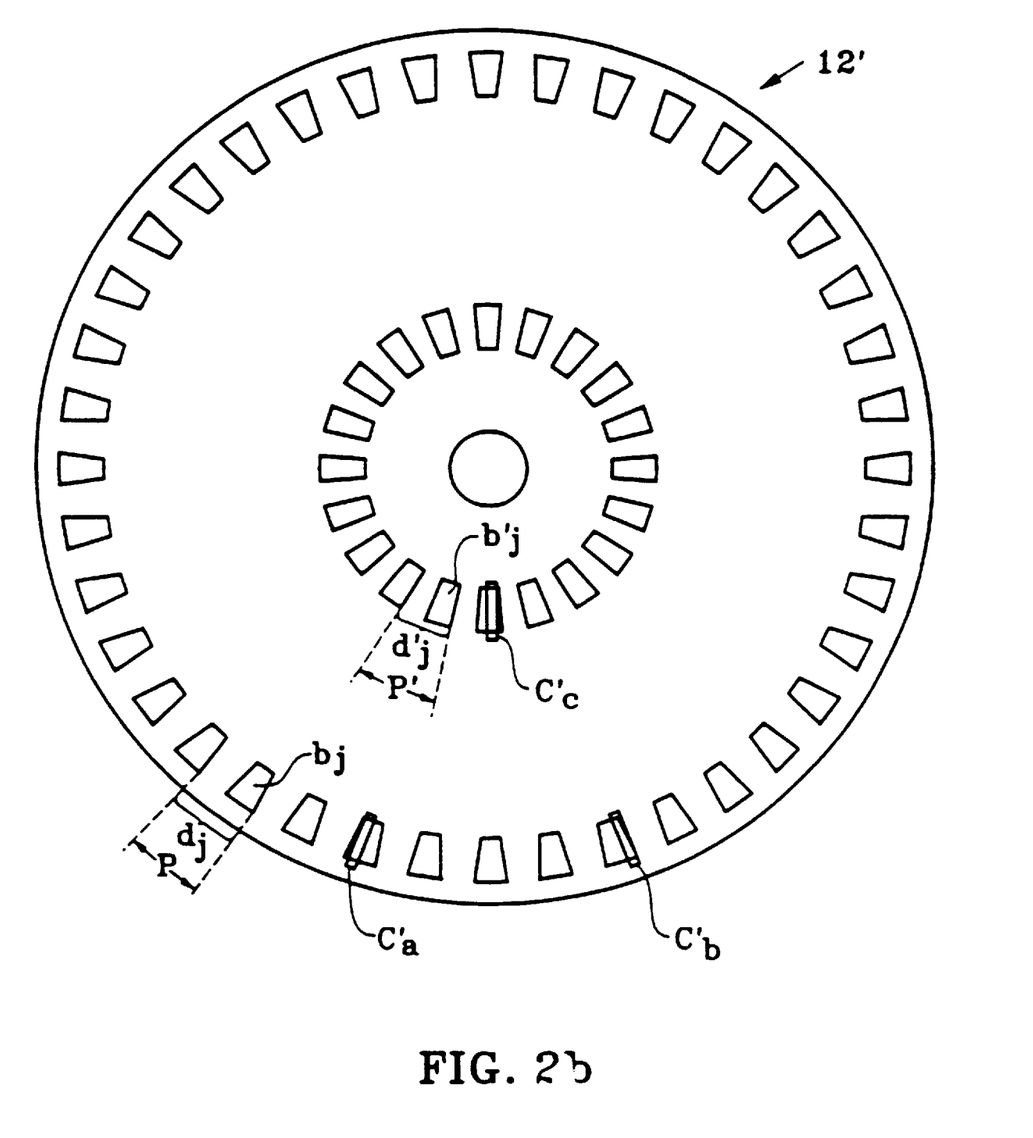
FIG. 2b is a plan view of a coding wheel having slots and of the associated optical sensors.

FIG. 2b shows a variant embodiment of the coding wheel of the pulse encoder of the invention.

In this variant, the coding wheel 12' has firstly primary divisions d$_j$ of pitch P defined by slots f$_j$ formed around an outer ring of the wheel 12', and secondly secondary divisions d'$_j$ of pitch P'=2P defined by slots f$_j$ formed around an inner ring concentric with the outer ring having said primary divisions.

Two primary optical sensors C'a and C'b are disposed in register with the primary divisions d$_j$ so as to be offset from each other by one-fourth of a period, i.e. P/4, modulo P. It should be observed that the sensors C'a and C'b are elongate rectangles in the radial direction, with this shape being obtained by placing said sensors behind fixed slots referred to as "phase" slots.

In similar manner, a secondary optical sensor C' c analogous to the primary sensors is placed in register with the secondary divisions d'$_j$ without it being necessary for there to be any particular phase relationship with the primary sensors.

It should be observed that the primary slots f$_j$ are trapezoidal in shape with this having the effect that the primary signals S'a and S'b delivered while the coding wheel 12' is rotating are likewise trapezoidal in shape, as shown in FIG. 4a. The same applies to the secondary signal S'c.

The advantage of having trapezoidal signals S'a and S'b is as follows.

At the outlets from the primary sensors C'a and C'b, the primary signals S'a and S'b are shaped by triggering an electronic trigger starting at a high threshold H on the rising edge of the pulse and by returning to zero at a low threshold B on the falling edge. This gives rise to rectangular pulse signals S"a and S"b as shown in FIG. 4b.

It will be understood that under such circumstances, the encoder will not perceive small mechanical vibrations, e.g. about the high trigger point H, since the levels of the primary signals S"a and S"b after shaping remain constant, high in the example under consideration, without any return to the low level being possible since such a return would require passing through the low trigger point B.

The processing of the pulse signals Sa, Sb, and Sc of FIG. 3a, for example, is explained below with reference to FIG. 5.

As shown in said figure, the three signals Sa, Sb, and Sc coming from the sensors Ca, Cb, and Cc of the coding wheel 12 are first synchronized by means of an electronic bistable 20 under the control of a clock 21.

Thereafter, the synchronized primary signals Sa and Sb are applied successively to a detector 30 for detecting the direction of meter rotation and to a detector 40 for detecting vibration, for the purpose of eliminating from said signals any parasitic pulses due to a reversal of direction of rotation or to vibration, as explained above. The resulting signals Sa* and Sb* are identical but offset by one-fourth of a period, and in theory they now contain only pulses that are representative of the flow of dispensed liquid.

The signals Sa* and Sb*, and the secondary signal Sc are processed by an error detector block 50 for detecting whether one or two of the three sensors is out of operation. If no breakdown is detected, the block 50 outputs two signals S1 and S2 which are the signals Sa* and Sb* shaped to be suitable for being transmitted to and read by the computer.

The signals S1 and S2 are normally at a high level, with the pulses being represented by low levels that are not simultaneously on both channels.

If a sensor breakdown is detected by the error detector block 50, then the signals S1 and S2 are forced to a low level so as to be taken into account by the computer and thereby halt dispensing.

Figure 5:
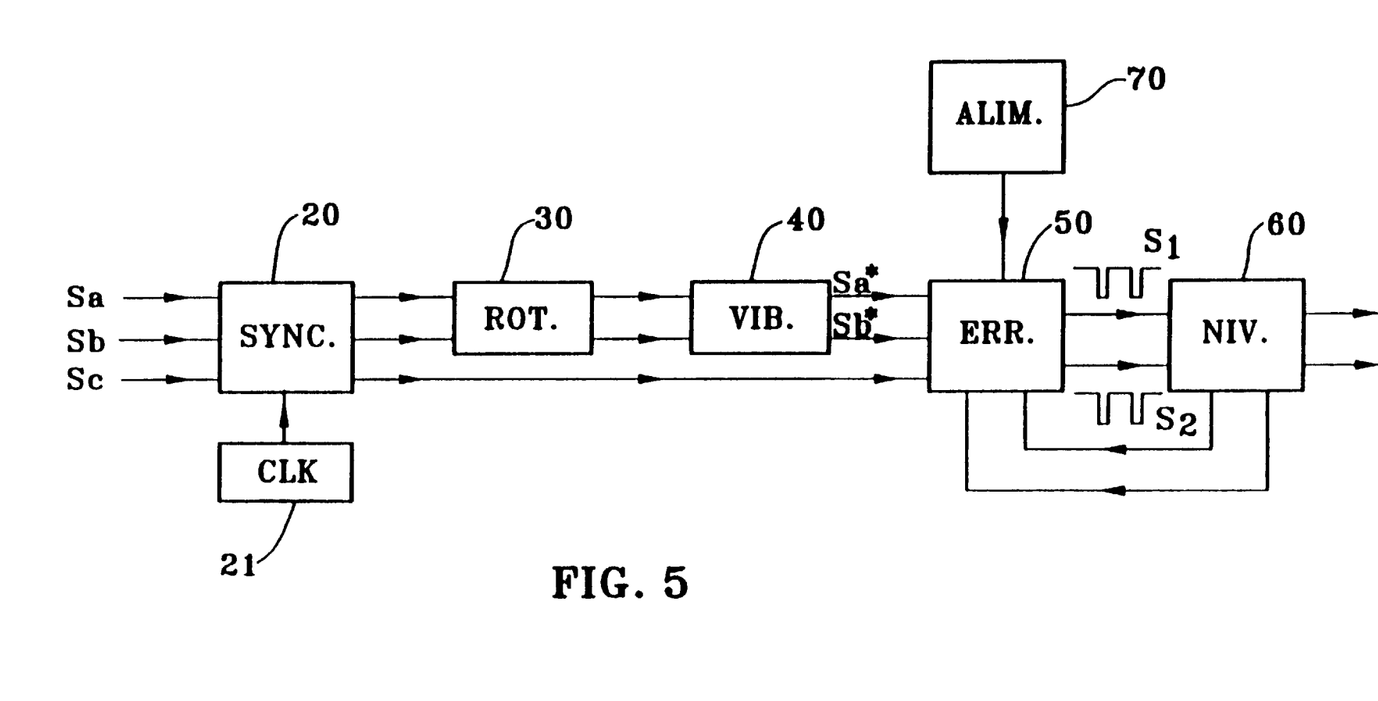

It may be observed in FIG. 5 that the power supply to the processing system is also monitored by the error detection block 50. If the power supply is not present, then the signals S1 and S2 are forced to a low level, thus having the same effects as in the event of a sensor breaking down.

Finally, it is necessary to mention that a level monitor 60 is present on the output from the error detector block 50, having the function of detecting, by correlation with the signals Sa*, Sb*, the existence of any short circuit on the line for transmitting the signals to the computer, where such short circuits might be due to cabling faults or to fraud.

I claim:

1. A pulse encoder for fitting to a meter (10) of a liquid dispenser device for the purpose of supplying a signal representative of the flow of liquid dispensed, said encoder comprising:

a coding wheel (12; 12') driven by said meter (10) at a speed of rotation that is substantially proportional to the liquid flow rate, said wheel (12, 12') carrying a first series of divisions (d$_i$; d$_j$) of angular period P, and referred to as "primary" divisions;

two primary sensors (Ca, Cb; C'a, C'b) suitable for detecting said primary divisions (d$_i$, d$_j$) and angularly offset from each other by one-fourth of the angular period, so as to provide two primary pulse signals (Sa, Sb; S'a, S'b) that are likewise offset by one-fourth of a period;

wherein said coding wheel (12; 12') also carries a second series of divisions (d'$_i$; d'$_j$), referred to as "secondary" divisions, of angular period P' equal to twice the angular period P of the primary divisions (d$_i$; d$_j$), a secondary sensor (Cc; C'c) being suitable for detecting said secondary divisions (d'$_i$; d'$_j$) so as to supply a secondary pulse signal (Sc; S'c) of period that is double the period of the primary pulse signals (Sa, Sb; S'a, S'b); and Wherein said encoder includes processor means suitable for supplying said signal representative of the flow of liquid dispensed on the basis of the primary and secondary pulse signals.

2. An encoder according to claim 1, wherein said divisions (d$_i$, d'$_i$; d$_j$, d'$_j$) are slots (b$_i$, b'$_j$) formed along two concentric rings of the coding wheel (12'), said sensors (C'a, C'b, C'c) being optical sensors.

3. An encoder according to claim 2, wherein said primary divisions are trapezoidal slots (b$_i$).

4. An encoder according to claim 1, wherein said divisions (d$_i$, d'$_i$) are pairs of opposite magnetic poles (N, S) disposed in alternation around two concentric rings of the coding wheel (12), said sensors (Ca, Cb, Cc) being Hall-effect sensors.

* * * * *